W. M. LEWIS.
RECEPTACLE FOR BOTTLES.
APPLICATION FILED DEC. 6, 1916.
1,280,501. Patented Oct. 1, 1918.
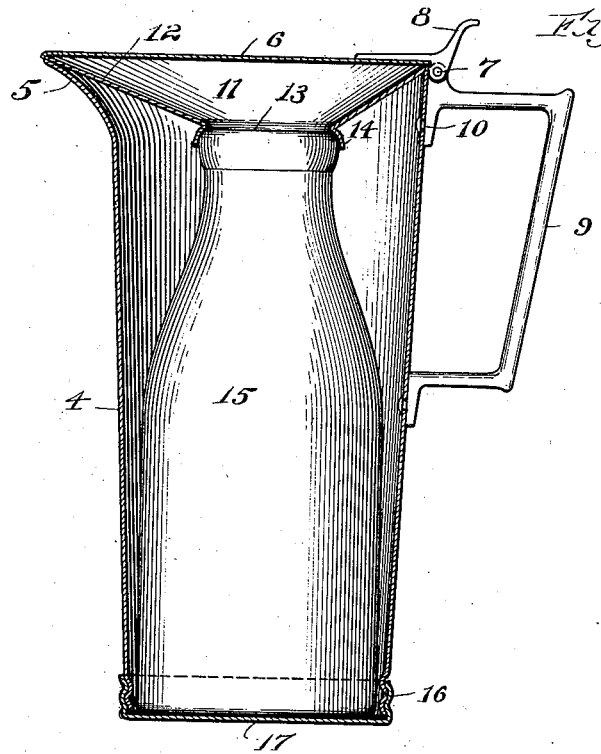
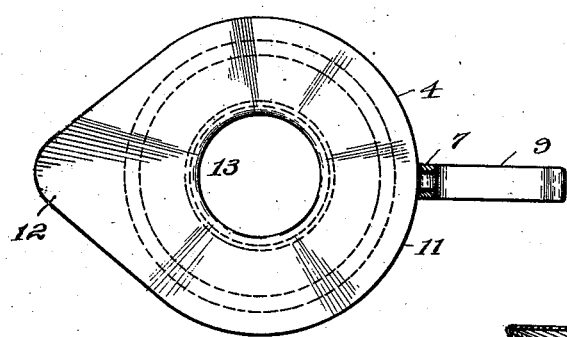
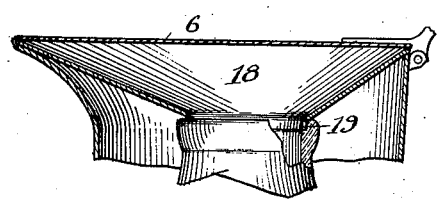
Inventor,
William Mather Lewis.
By Glenn S. Noble,
Atty.

UNITED STATES PATENT OFFICE.

WILLIAM MATHER LEWIS, OF LAKE FOREST, ILLINOIS.

RECEPTACLE FOR BOTTLES.

1,280,501.  Specification of Letters Patent.  Patented Oct. 1, 1918.

Application filed December 6, 1916. Serial No. 135,314.

*To all whom it may concern:*

Be it known that I, WILLIAM MATHER LEWIS, a citizen of the United States, residing at Lake Forest, in the county of Lake and State of Illinois, have invented certain new and useful Improvements in Receptacles for Bottles, of which the following is a specification.

In accordance with the modern sanitary methods of handling milk, the milk is exposed as little as possible to contamination. For this reason it is suggested, in the use of what is commonly known as "certified milk", to serve the same from the bottles, which will avoid the pouring of the milk into another receptacle. As ordinary milk bottles are not of particularly pleasing appearance, such directions are not apt to be complied with, as the bottles do not present a pleasing appearance on the table. Furthermore, such bottles are usually not provided with a pouring lip, so that the milk or cream is apt to run down on the outside of the bottle.

The present invention relates to a receptacle or container for bottles such as milk bottles or the like, which is also adapted to serve as a convenient means for pouring the contents from such bottles.

The objects of the present invention are to provide a container for milk bottles or the like, which will be pleasing in appearance, which will permit the ready pouring of the contents from the bottle, which is adapted to receive bottles of slightly varying sizes, which will be easily and conveniently cleaned or sterilized, and which will have such advantages as will appear more fully from the following description.

In the accompanying drawings illustrating this invention:

Figure 1 is a vertical sectional view of my improved receptacle, showing a bottle inserted therein;

Fig. 2 is a plan view with the cover removed; and

Fig. 3 is a sectional detail showing a slightly modified form of construction.

As illustrated in these drawings, the receptacle comprises a body portion 4, which may be of any suitable size or configuration, and which will readily be adapted for ornamentation if desired. The body portion 4 is provided at its upper end with a lateral projection 5 for the pouring lip, and is also provided with a cover 6, which is hinged at 7 and may be readily opened by means of a thumb piece 8. The body portion is also preferably provided with a handle 9, which may be of any suitable form and affixed thereto in any convenient manner, as by means of the rivets 10.

The receptacle is provided with an inner top or diaphragm 11, preferably of substantially conical or funnel shape, with a pouring lip 12 at one side thereof. The top 11 has a central aperture 13, which is surrounded by a flange 14, which is tapered so that it will fit over the outside of the different sized tops of bottles 15. The lower end of the body portion 4 is threaded as indicated at 16, to receive the threaded bottom portion 17.

The method of use of my improved receptacle will be readily understood from the drawings and the above description. The bottle 15 is inserted through the bottom of the receptacle, and the bottom 17 is then screwed on, which will force the top of the bottle into close engagement with the flange 14. The ordinary paper cover may be removed either before or after the bottle is inserted in the receptacle. With the parts arranged in this manner, the contents of the bottle, such as milk or cream, will be fully protected by the cover 6, and may be poured directly from the bottle. In this manner the contents are not exposed, and the receptacle may be made of pleasing appearance, so that it will form an ornamental as well as useful addition to the tableware. After the bottle has been emptied, it may be removed and the receptacle can be conveniently washed or sterilized.

In the modified form of construction shown in Fig. 3, the top 18 is shown as being provided with a flange 19, which fits within the cover seat on the inside of the bottle, instead of fitting over the bottle, as shown in Fig. 1.

Having thus described my invention, which, however, I do not wish to limit to the details of construction or exact arrangement herein shown and described, except as specified in the following claims, what I claim as my invention and desire to secure by Letters Patent is:

1. A receptacle for milk bottles, comprising a closed body portion having an inwardly and downwardly extending top with a flanged aperture adapted to register with the top of the bottle, said body portion having a threaded bottom for forcing the bottle into engagement with said flange and a cover for closing the upper end of said body portion.

2. A holder for milk bottles, comprising a body portion having a conically shaped top with a pouring lip at one side thereof, said top having a central aperture adapted to register with the top of the bottle, and having a flange for engagement with the top of the bottle, said body portion also being threaded at its lower end, a threaded bottom for engagement with said lower end, a handle, and a hinged cover for the top of the receptacle.

3. In a device of the character set forth, the combination of a body portion adapted to receive a milk bottle or the like, a centrally apertured diaphragm at the top of the body portion, a flange around the central aperture for engagement with the top of the bottle, means for holding the bottle with its top in engagement with the flange, a cover, and a handle for said body portion.

WILLIAM MATHER LEWIS.